(No Model.)
A. KUHN.
BASKET.
No. 565,006. Patented Aug. 4, 1896.
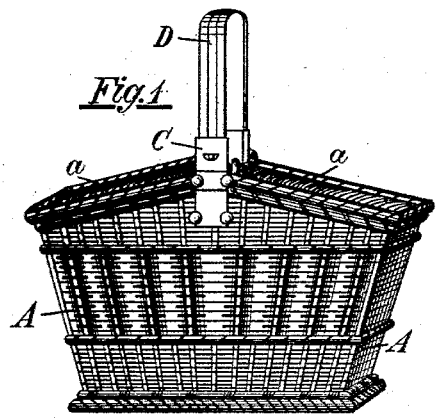
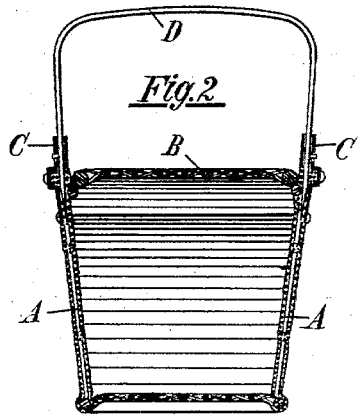
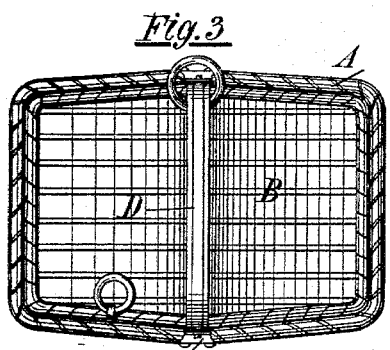
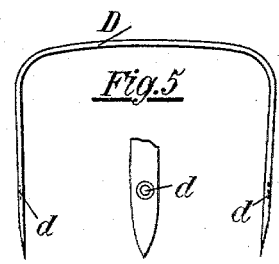
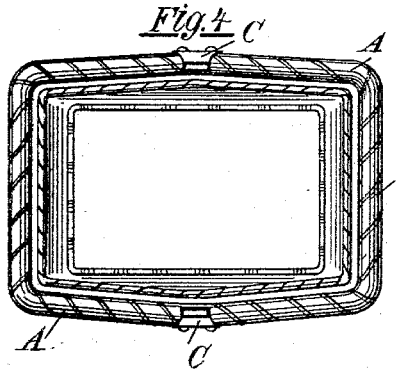
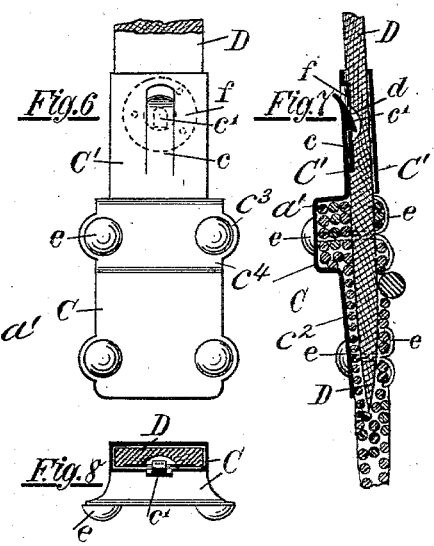
Witnesses:
M. C. Massie
T. H. Libbey
Inventor.
August Kuhn
by Max Bergü
Attorney

UNITED STATES PATENT OFFICE.

AUGUST KUHN, OF METZINGEN, GERMANY.

BASKET.

SPECIFICATION forming part of Letters Patent No. 565,006, dated August 4, 1896.

Application filed January 18, 1896. Serial No. 575,991. (No model.)

*To all whom it may concern:*

Be it known that I, AUGUST KUHN, manufacturer of baskets, residing in Metzingen, Würtemberg, Germany, have invented new and useful Improvements in Baskets, of which the following is a specification.

My invention relates to an improvement in baskets.

The object of my invention is to provide a basket with a removable handle, which may be readily removed for purposes of shipment and as readily put in place, without the use of tools, and which, when thus put in place, will be firmly held, the fastening device being such as is specially applicable to wicker-work baskets and the like and not weakening them.

The invention consists in the features, details of construction, and combination of parts which will first be described in connection with the accompanying drawings, and then particularly pointed out in the claims.

In the drawings, Figure 1 is a perspective view of a basket embodying my invention, such basket being of the double-lid variety; Fig. 2, a transverse section of the same; Fig. 3, a plan view of the same; Fig. 4, a plan view with the handle and lids removed; Figs. 5 to 8, inclusive, detail views of the handle-attaching device.

Referring to the drawings, A is a basket provided with lids B, which, instead of resting upon the upper edge of the basket, as usual, are arranged to close against an inner bead or rim $a$, whereby the lids are protected against lateral shocks, and also assist in strengthening the basket and holding it in shape when closed.

To each of the longitudinal sides of the basket is attached a socket device C, consisting of an outer plate $c^2$, provided with perforated ears $c^3$, an outward-extending loop $c^4$, and a sheath C' above the loop, said sheath having a spring-tongue $c$, stamped outward from the metal forming the sheath and provided with a catch $c'$. The socket device is secured to the basket in the following manner: The plate $c^2$ is arranged on the outside of the basket, the loop $c^4$ embracing the exterior bead or rim $a'$ of the basket, and is held to the basket by fastening devices or catches of any suitable kind passing through the wicker-work and clenched down inside the basket, the fastening device illustrated being made somewhat similar to the ordinary well-known paper-fastener, having a head and two prongs, which are passed through the holes in the ears $c^3$ through an opening between the osiers or reeds, and then bent down in opposite directions upon the inside of the basket. By this construction the loop $c^4$ embraces the exterior bead or rim $a'$ and largely sustains the weight of the basket and its contents, whereby the fastening devices have but little strain upon them.

The handle D has its ends arranged to enter the sheaths C' and pass down between the outer and inner layers of reeds or osiers for a short distance only. Furthermore, each end is provided with a notch or recess $d$, which may be surrounded with metal if desired, and which receives the catch $c'$ on its respective spring-tongue. To connect the handle to the basket, it is only necessary to insert the ends of the handle into the sheaths and press down on said handle, whereupon the spring-tongues will be forced outward until their catches come opposite the respective recesses in the ends of the handle, into which recesses the catches will enter and firmly hold the handle against withdrawal.

To remove the handle, the spring-tongues are pulled outward to release their catches from the recesses in the ends of the handle, whereupon the latter is freed and may be readily drawn out of the sheaths.

While I have described the spring-tongues as located upon the sheaths and the recesses in the ends of the handle, this construction may be reversed, if desired, without departing from the spirit of my invention.

Having thus fully described my invention, what I claim, and desire to secure by Letters Patent, is—

1. The combination, with a basket, and a pair of plates secured one on each side of the basket, and provided with sheaths, of a handle having ends arranged to enter said sheaths, and spring-tongues provided with catches arranged to lock the handle to the sheaths, substantially as set forth.

2. The combination, with a basket, and a pair of plates secured one on each side of the basket and provided with sheaths, said sheaths having spring-tongues carrying catches, of a handle having ends arranged to enter said sheaths, said ends being recessed to receive the catches on the spring-tongues, substantially as set forth.

3. The combination, with a basket having a bead, and a pair of plates secured one on each side of the basket and provided with loops embracing the bead, of a handle connected to said plates, substantially as set forth.

4. The combination, with a basket having a bead, of a pair of plates having loops embracing the bead, perforated ears at each side, and sheaths at the upper ends, fastening devices passing through the perforations in the ears and through the sides of the basket, a handle provided with ends arranged to enter the sheaths, and means for locking the said ends to the sheaths, substantially as set forth.

In testimony whereof I have signed this specification in the presence of two subscribing witnesses.

AUGUST KUHN.

Witnesses:
AUGUST B. WANTZ,
CHRISTIAN BAUER.